United States Patent
Lee et al.

(10) Patent No.: US 7,084,911 B1
(45) Date of Patent: Aug. 1, 2006

(54) BLACK LEVEL CALIBRATION METHOD FOR IMAGER WITH HYSTERESIS COMPARISON AND ADAPTIVE STEP SIZE

(75) Inventors: Bumha Lee, Mountain View, CA (US); Andrew Kenneth John McMahon, Sunnyvale, CA (US)

(73) Assignee: Eastman Kodak Company, Rochester, NY (US)

(*) Notice: Subject to any disclaimer, the term of this patent is extended or adjusted under 35 U.S.C. 154(b) by 795 days.

(21) Appl. No.: 10/290,782

(22) Filed: Nov. 8, 2002

(51) Int. Cl.
 *H04N 9/64* (2006.01)
 *H04N 9/73* (2006.01)
 *H04N 5/217* (2006.01)
 *H01L 27/00* (2006.01)

(52) U.S. Cl. .................. 348/243; 348/615; 348/226.1; 250/208.1

(58) Field of Classification Search ................ 348/243, 348/245, 251, 257, 615, 226.1, 228.1; 358/529; 250/208.1
See application file for complete search history.

(56) References Cited

U.S. PATENT DOCUMENTS

| | | | | |
|---|---|---|---|---|
| 5,105,276 A | * | 4/1992 | Schrock | 348/241 |
| 5,408,335 A | * | 4/1995 | Takahashi et al. | 358/443 |
| 5,410,365 A | * | 4/1995 | Nakamura et al. | 348/615 |
| 5,736,886 A | * | 4/1998 | Mangelsdorf et al. | 348/243 |
| 6,252,536 B1 | * | 6/2001 | Johnson et al. | 341/155 |
| 6,750,910 B1 | * | 6/2004 | Bilhan | 348/243 |
| 6,774,941 B1 | * | 8/2004 | Boisvert et al. | 348/243 |
| 6,774,942 B1 | * | 8/2004 | Salcedo et al. | 348/243 |
| 6,791,484 B1 | * | 9/2004 | Lee et al. | 341/118 |
| 6,791,607 B1 | * | 9/2004 | Bilhan et al. | 348/243 |
| 6,829,007 B1 | * | 12/2004 | Bilhan et al. | 348/243 |

(Continued)

FOREIGN PATENT DOCUMENTS

| JP | 2003209713 A | * | 7/2003 |
|---|---|---|---|
| JP | 2004304224 A | * | 10/2004 |

OTHER PUBLICATIONS

"Color CMOS Inage Sensor SXGA 18 FPS", *National Semiconductor Corporation*, LM9648, May 2002, pp. 1-2.

*Primary Examiner*—David Ometz
*Assistant Examiner*—John M. Villecco
(74) *Attorney, Agent, or Firm*—Peyton C. Watkins

(57) ABSTRACT

The present invention provides a method and apparatus for calibrating a black level in an imager to reduce flicker noise. A first and a second range is set. The first range corresponds to a range that is larger than a noise level at a highest PGA gain. The second range corresponds to a range that is smaller than a level which reduces an ADC dynamic range too much due to a large black level. The ranges may be adjusted to changes in an imager in real time. When the black level is within the second range a determination is made as to whether the black level has been calibrated before. When it has, the DAC output is held constant. Otherwise the DAC code is adjusted such that the black level is moved toward the first range. A small step size is used in adjusting the DAC code in order to reduce flicker. Step sizes may be adjusted according to the black level in relation to the ranges. A small step size is used when the black level is within the second range. A large step size is used when the black level is beyond the second range.

28 Claims, 4 Drawing Sheets

U.S. PATENT DOCUMENTS 6,909,460 B1 * 6/2005 Johnson ................. 348/243
6,940,548 B1 * 9/2005 Ying et al. ................. 348/243
2004/0189839 A1 * 9/2004 McDermott ................. 348/243
2005/0237402 A1 * 10/2005 Sase et al. ................. 348/257

* cited by examiner

Fig, 2

BLACK LEVEL CALIBRATION METHOD FOR IMAGER WITH HYSTERESIS COMPARISON AND ADAPTIVE STEP SIZE

FIELD OF THE INVENTION

The present invention is related to electronics, and more particularly to black level calibrating imaging circuits.

BACKGROUND OF THE INVENTION

Imagers are calibrated in order to produce an image of higher quality than if not calibrated. One level that is calibrated is the black level of a graphic imager. The black level of an imager has a fixed term, which is systematic offset, and a moving term, which is temporal offset due to changing supply voltages, temperatures, and the like. If these offsets are calibrated out purely in the digital domain then the dynamic range of the system is reduced.

If the offset is half of the Analog-to-Digital Converter's (ADC) range then the signal dynamic range is reduced by half due to this offset. When the offset places the wanted signal below the conversion range of the ADC, then the ADC cannot correctly represent this, and the signal is clipped to a zero code instead of a corresponding negative code. This clipping increases the dead zone of the imager and therefore reduces image quality. Analog domain offset calibration is widely used due to these reasons. If the target black level for calibration is set to be a small positive level, a negative offset can be calibrated without the clipping problem.

Fixed systematic offset can easily be calibrated out through the use of a simple Digital-to-Analog Converter (DAC). The DAC is configured to subtract the systematic offset. A digital circuit evaluates the offset and applies a suitable code to the DAC to remove the fixed systematic offset.

A moving offset, however, is harder to calibrate in this manner. Since the precise effect of the DAC on the signal is not known by a digital circuit, the calibration loop must be closed and iterative. This yields the possibility of oscillations. These oscillations can potentially add interframe noise or flicker noise, whereby the whole luminance level appears to increase/decrease on a frame by frame basis. This flicker noise deteriorates imager performance. What is needed is a black level offset calibration method to yield a high quality image sensor.

SUMMARY OF THE INVENTION

The present invention is directed at providing a method and apparatus for calibrating a black level in an imager adaptively to reduce flicker noise.

According to one aspect of the invention a first range and a second range is set. The second range is larger than the first range. The first range corresponds to a range that is larger than the noise level at a highest programmable gain amplifier (PGA) gain. The second range corresponds to a range that is smaller than a level which reduces an ADC dynamic range too much due to a large black level.

According to another aspect of the invention, the ranges are programmable. The ranges may be adjusted to changes in an imager in real time.

According to another aspect of the invention, the black level is compared to the first range and the second range. When the black level is within the second range a determination is made as to whether the black level has been inside of the first range more recently than it has been outside of the second range. When it has, the DAC output is held constant. Otherwise the DAC code is adjusted such that the black level is moved toward the first range.

According to yet another aspect of the invention, a small step size is used in adjusting the DAC code in order to reduce flicker noise during calibration.

According to still yet another aspect of the invention, step sizes are adjusted according to the black level in relation to the ranges. Different step sizes are used depending on the black level's relationship to ranges.

DETAILED DESCRIPTION OF THE PREFERRED EMBODIMENT

Figure 1:
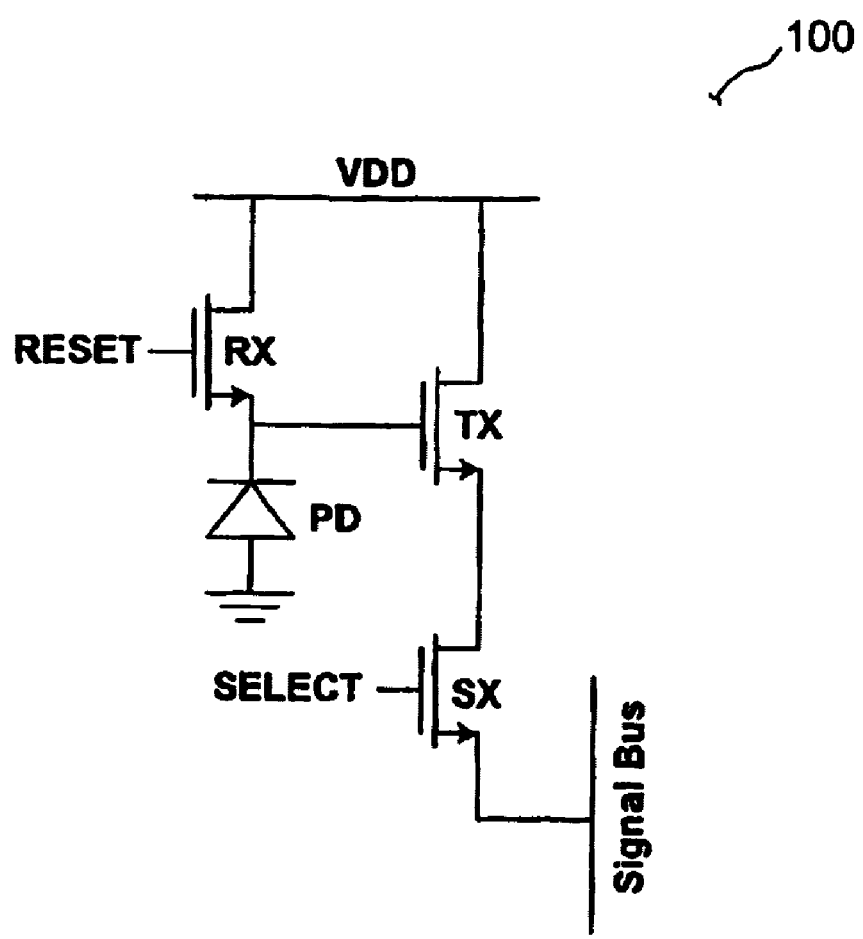
FIG. 1 illustrates a three transistor pixel.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

FIG. 1 illustrates a three transistor pixel. As shown in the figure, a three transistor pixel 100 includes a photo diode (PD) and three transistors (RX, TX, and SX). As illustrated in the figure, the pixel is a three transistor active pixel as is typically used in a CMOS imager.

The photo diode (PD) is configured to measure the intensity of light incident upon it. If the light level falling on the photo-diode is bright, then the output level of that pixel is high. Similarly, if the light level falling on a the photo-diode is low, then the output level of that pixel is low.

The operation of the pixel starts with the reset transistor (RX) being pulled up with a high voltage at the RESET node. The voltage is higher than the pixel supply voltage (VDD) such that any previous information is removed and an initial voltage level is set. The cathode node of the PD is then pulled up to the supply level (VDD). After the RESET is returned to a low voltage level (ground), light generates hold-zero pairs in the photo diode (PD), which discharges the cathode node of the photo diode (PD). Transfer transistor (TX) acts as buffer amplifier to transfer the voltage level of the cathode node of the photo diode (PD) to a common signal bus without signal attenuation due to charge redistribution. The gate node (SELECT) of the select transistor (SX) is pulled up when reset and signal levels are read out from the pixel.

Black level in the context of an image sensor is the output that results when reading out the imager's array upon which not light has fallen. This means that the objective of the imager is completely dark. If there is no offset in the signal readout path, from the pixels to the ADC, and no light is falling on the pixels, then the output level of the imager should be zero. The output level of the imager, however, is some positive level due to the junction leakage current of the photo-diode. This depends on temperature, integration time, and the like.

The black level is dependent on process variation, temperature and integration time. Process variations are a fixed error in a chip, but the temperature and integration times may vary. Higher temperatures increase junction leakage current causing the black level to increase. A longer integration time accumulates leakage current longer and thus the black level will also increase. For a high quality image sensor, this changing black level needs to be removed.

Figure 2:
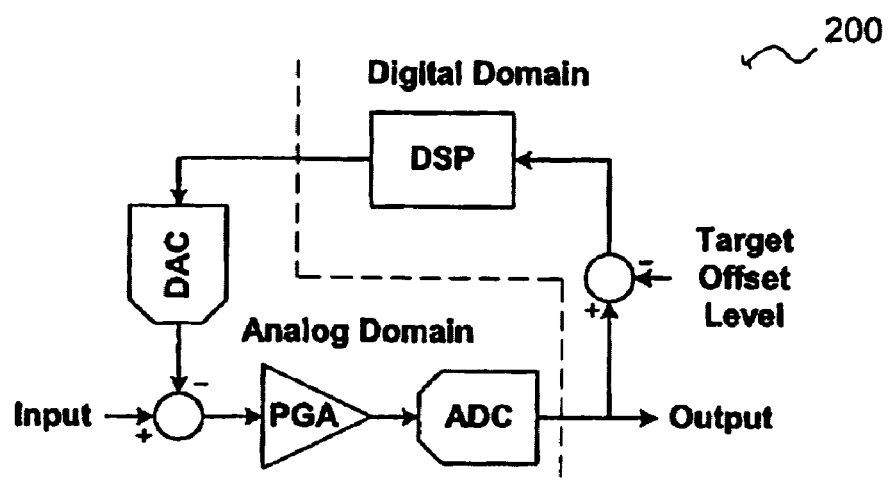
FIG. 2 illustrates a mixed mode black level calibration loop.

FIG. 2 illustrates a mixed mode black level calibration loop. The black level is estimated by reading out black level calibration pixels (BCPs), which are optically shielded to block out light. According to one embodiment of the invention, the BCPs are located along the right hand side of the pixel array. The BCPs may also be located at other locations within the pixel array. For example, the BCPs may be at the top/bottom or right/left of the pixel array. Because no light should fall on to the BCPs, the output signals corresponding to the BCPs correspond to the black level caused by charge coupling noise, junction leakage, and the like.

Mixed mode black level calibration loop 200 is a circuit comprising analog and digital circuitry designed to control offset. The BCPs are read through a programmable gain amplifier (PGA) and an Analog-to-Digital Converter (ADC). The PGA amplifies the incoming signal to maximize the utilized range of the ADC so as to minimize the quantization noise. The ADC outputs digital codes corresponding to the analog signal level of the output of the PGA. If the offset is negative and the target black level is zero, the ADC outputs a zero code corresponding to negative offset. Since the target is zero and the output is zero, a calibration circuit would falsely believe the offset has been removed. If the target black level is a small positive code it is then possible to calibrate not only a positive offset but also a negative offset. If the target black level is too large, the ADC output range is reduced and, therefore, the dynamic range is reduced. The target black level is subtracted from the ADC output to determine the offset level. This error is then fed into a digital signal processing (DSP) block to determine how it will be removed. The DSP output is converted from a digital code to a corresponding analog signal through a Digital-to-Analog Converter (DAC). Subsequently, when the pixel data is read out, the offset is counteracted by the DAC output. If the DAC's output is fed in to the signal path at the front of the ADC, the resolution of calibration accuracy is not affected by the gain of the PGA. However, calibration range is reduced by a factor of the maximum gain of the PGA. Also the offset at the input of the PGA can become very large due to temperature or long integration times which could cause the signal to become saturated in the PGA. If the DAC's output is fed into the signal path before the PGA, both the range reduction and saturation problems can be avoided.

In conventional black level calibration methods, the DSP could contain a low pass filter or an exponential filter to dampen or slow down movements in the offset correction codes going to the DAC. The problem with this basic scheme, however, is that the bandwidth of the filter is fixed. This means that if the bandwidth is too high, random noise in the black level will be allowed to pass through causing random noise in the offset correction code. If the bandwidth is too low, the DSP's output would be too slow to react to a step input as would occur when a change in integration time occurs.

Another problem with a conventional black level calibration algorithm is the offset correction code to the DAC is continuously being revised to ensure that the target for the black level is being met. When the black level is close to the triggering point of the ADC (meaning that the black level is very close to one of the comparison points) any remaining tiny black level signal and ADC noise can cause the ADC output to toggle by +/−one LSB. This means that the offset correction code feeding the DAC can move up and down to try to correct for this noise. The smallest step the offset correction code can make is 1 LSB of the DAC. When the imager is focused onto a bright scene and the PGA gain is small, then the +/−one LSB of noise in the offset correction code is not visible and negligible. If the imager is operating in low light conditions, however, and hence a high PGA gain is required to reduce the quantization noise level relatively, the one LSB of toggling noise is amplified by the amplification factor and it becomes visible and large. This noise is referred to as "Flicker Noise." If the maximum gain of the PGA is 20 times and the resolution of the black level calibration DAC is twenty LSBs of the ADC, flicker noise is 20 LSBs at maximum gain. Flicker noise at this level results in unacceptable image quality.

Black Level Calibration with Hysteresis Comparison

The human eye is very sensitive to changes which occur in a short time frame. The eye is also sensitive to small differences between adjacent blocks. The eye, however, is generally insensitive to changes which occur slowly, as well as to small differences on a pixel by pixel basis. This is one reason why differential non-linearity is a critical characteristic of an ADC.

Figure 3:
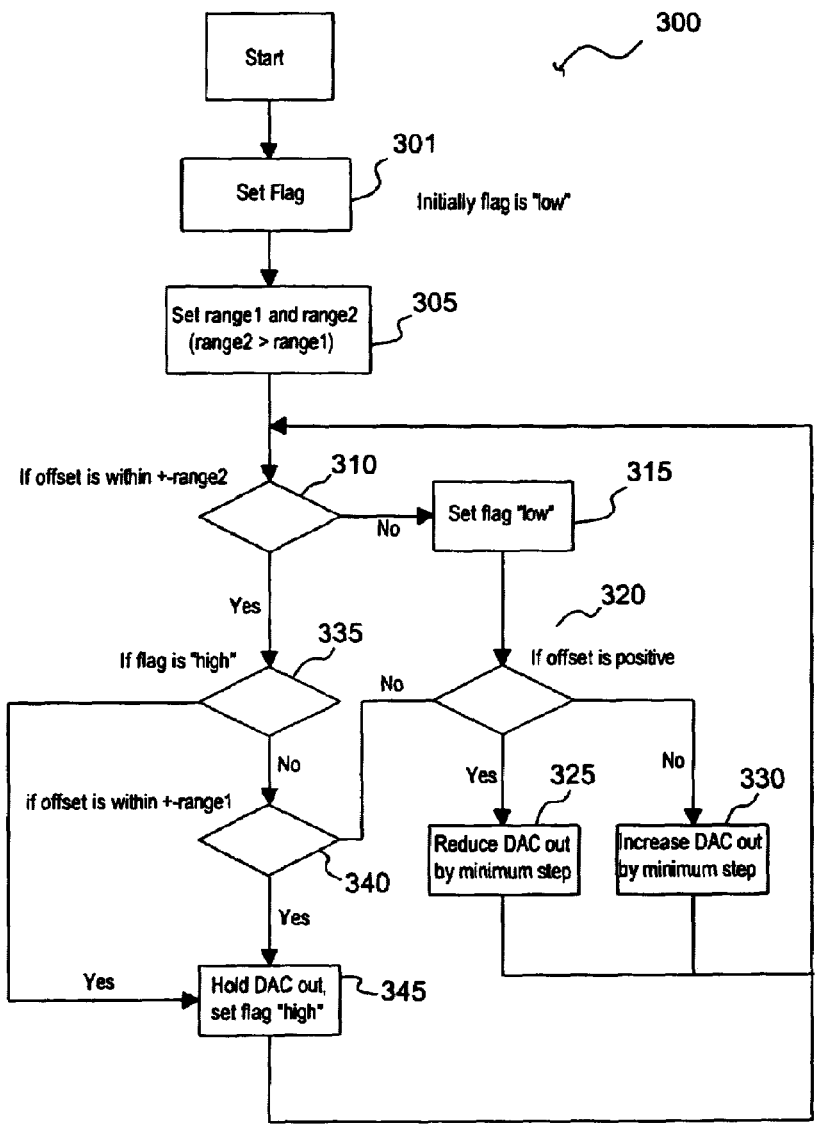
FIG. 3 illustrates a basic black level calibration method with hysteresis.

FIG. 3 illustrates a basic black level calibration method with hysteresis, according to aspects of the invention. As shown in the figure, there are two comparison levels (range 1 and range 2) to aid in the prevention of flicker noise as occurs in a conventional black level calibration method. After a start block, black level calibration method 300 flows to block 301, where upon initialization of the calibration circuitry, a calibration flag is set to "low." The "low" value of the calibration flag indicates that the black level has not yet been calibrated to be within range 1.

Moving to block 305, the process sets the ranges for range 1 and range 2. Before calibrating, ranges 1 and 2 are set to appropriate values as determined by the desired calibration speed and the noise level at highest gain. Range 1 is generally set to be larger than the noise level at highest PGA gain. Range 2 is generally set to be smaller than a level which reduces the ADC dynamic range too much due to a large black level. According to one embodiment of the invention, range 1 is set to be 24 LSB from the target, and range 2 is set to be 36 LSB from the target. Ranges 1 and 2 are programmable. Additionally, the ranges may be programmed during operation of the imager. For example, if the imager is in a low light situation the ranges may be expanded to remove the larger noise. The ranges may also be programmed in response to an adjustment of a function on the device. For example, if the shutter speed changes then the ranges may be adjusted.

When calibration begins, the Black level is measured and compared to range 2 (block 310). When the black level is not within range 2 the process flows to block 315 where the flag is set to low. Moving to decision block 320, a determination is made as to whether the black level is positive (i.e. the black level is higher than desired). When the offset is positive, the process transitions to block 325 where the DAC code is reduced by a minimum step. When the offset is not positive (i.e. the black level is smaller than desired), the process transitions to block 330 where the DAC code is increased with a minimum step.

When the offset is within range 2 (i.e. the black level is smaller than range 2), the status of the flag is checked at decision block 335. In the case where the black level is smaller than range 2 and the flag is set to "high" then the black level has previously been within range 1 (hence calibrated) and the black level is probably just drifting away from the target but it is still within range 2. The action of the circuit in this scenario is to move to block 345, where the DAC value out is held, and the flag is maintained "high."

If the flag is "low", this means that the black level has not previously been within range 1 (hence is still in need of calibration) and the action of the circuit is to increase or decrease the DAC code to push the black level into range 1.

Once the black level is within range 1 (hence the black level is calibrated), as determined at block 340, the DAC code is held without any change and the flag is set "high." (block 345)

Once the flag has been set "high," the black level is considered calibrated and no change of the DAC code occurs until the black level moves beyond range 2. Upon such an event, calibration will begin again and the flag will be reset to "low." If the black level drifts out of range 1 but remains within range2 and the flag is set "high" (hence the black level has been calibrated within range 1 previously), the DAC code will not change and the flag remains "high." Minimum step changes of the DAC code limits the slew rate of the offset calibration circuit to a very small step resulting in a slow offset change. This reduces flicker noise.

The comparison of the Black level to the ranges (range 1, range2) and subsequent changes in the DAC code can be done on a per frame basis or on a multiple frame basis to suppress flicker noise more.

Temperature changes can cause the black level to drift. The temperature changes typically occur very slowly such that the human eye cannot detect the change. That is, provided that the change is not too big so as to reduce the ADC output range. If the black level is calibrated during this slow drift, as would occur in a conventional offset correction scheme, image quality is deteriorated due to the addition of flicker noise.

Black Level Calibration with Hysteresis and Adaptive Step Size

Changes in integration time can move the black level quickly. This is because junction leakage current, which is a major source of black level, will be accumulated for different time interval.

Gain changing can also move black level quickly even if integration time and temperature do not change. This is because gain changing multiplies the effective junction leakage by the amplification factor. If the unit step size of the DAC code change is small and the black level is at the edge of range 2, then the integration time and/or the gain could change, causing the black level to jump to a much bigger level than range 2. This can deteriorate the image quality significantly. Additionally, when the imager is turned on, the initial black level may be much bigger than range 2. If a very small step size per frame were used, it would take a long time to calibrate the big black level to within range 1. During the long calibration interval the image quality would be unacceptable.

Due to these, and other, reasons, the unit calibration step size, as well as the frequency of black level measurement and correction, is changed according to different situations that occur. For example, according to one embodiment of the invention, the frequency of black level measurement and correction can range from a frame to frame frequency to a line by line (or intra-frame) frequency. An advantage of this approach is that the black level may be adjusted when the integration time or gain changes (causing a disturbance in the visual image). The eye, therefore, will only notice the change due to the initial disturbance, and not notice the change in the black level.

Figure 4:
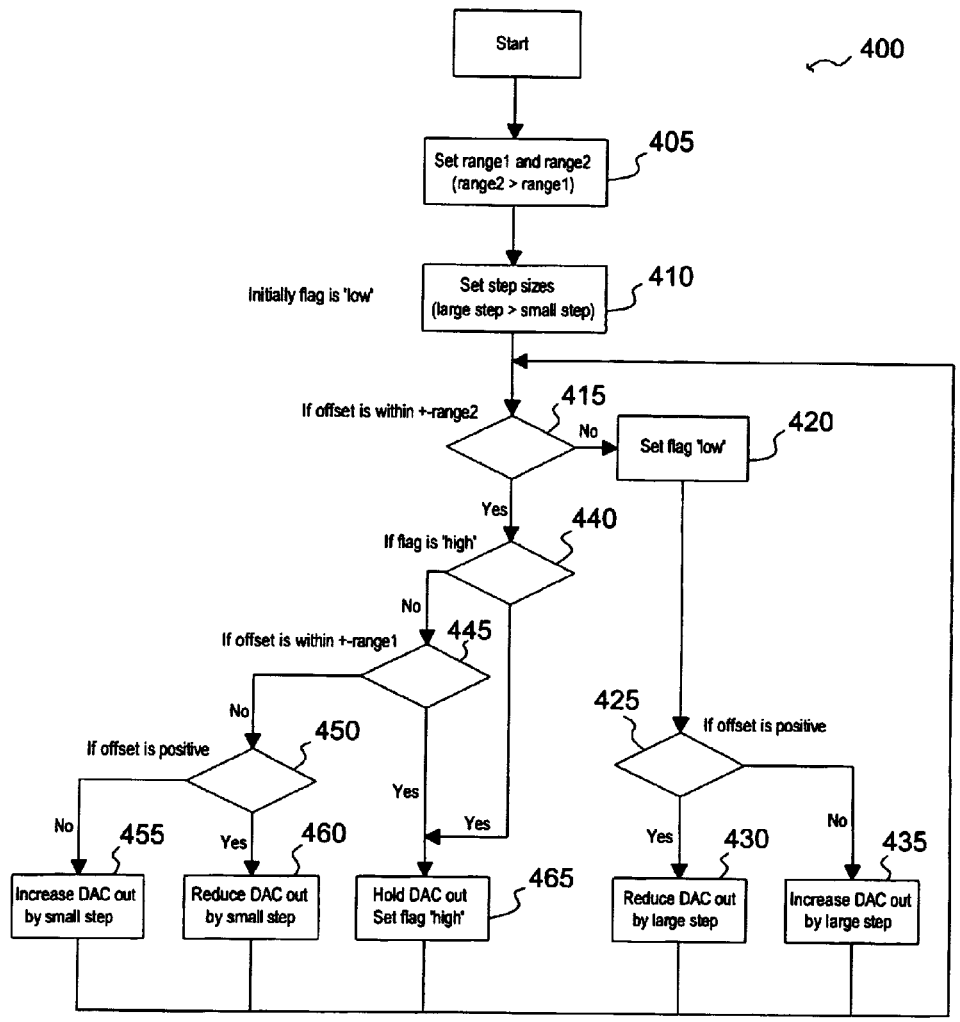
FIG. 4 illustrates a black level calibration method with hysteresis comparison and adaptive step size; in accordance with aspects of the invention.

FIG. 4 illustrates a black level calibration method with hysteresis comparison and adaptive step size, according to aspects of the invention. The calibration flow 400 illustrated in the figure is substantially similar to the flow shown in FIG. 3, except that the flow in FIG. 4 makes use of different unit step sizes of black level calibration. Before calibration begins, two different step sizes are set for fast calibration (block 410). When the black level is beyond range 2, the process moves to block 420 where the calibration flag is set to "low." Moving to decision block 425, a determination is made as to whether the offset is positive. When the offset is positive, the process flows to block 430 where a large step is subtracted from the DAC code. When the offset is not positive, the process transitions to block 435 where a large step size is added to the DAC code. The use of a larger step size when the black level is beyond range 2 ensures that convergence time, when black level changes by a large amount, is kept to a minimum.

When the black level is inside range 2, the process moves to decision block 440 where a determination is made as to whether the calibration flag is at a "high" level. When the flag is not set high, the process moves to decision block 445 where a decision is made as to whether the offset is within range 1. When the offset is within range 1, the flow moves to block 465 where the flag is set to "high." When the flag is set to high, the output of the DAC is held at the present code. When the offset is not within range 1, the process moves to decision block 450 where a determination is made as to whether the offset is positive. When the offset is positive, the process flows to block 460 where the DAC code is reduced by a small step. When the offset is not positive, the flow moves to block 455, where the DAC code is increased by a small step size. This helps to ensure that when the black level error changes polarity that no oscillations are introduced that can introduce flicker noise.

Flicker noise caused by improper black level calibration methods can be reduced or eliminated through the use of a hysteresis comparison method. The black level is calibrated within shorter time intervals with the use of an adaptive calibration step sizes without image quality degradation.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for calibrating a black level in an imager to reduce flicker noise, comprising:
   setting a first range;
   setting a second range;
   measuring the black level;
   comparing the black level to the second range;
   determining when the black level is within the second range; and when it is:
      determining if the black level has been calibrated, and when it is holding a DAC output; otherwise
      adjusting a DAC code such that the black level is moved toward the first range.

2. The method of claim 1, wherein the second range is larger than the first range.

3. The method of claim 1, wherein the first range corresponds to a range that is larger than a noise level at a highest PGA gain.

4. The method of claim 1, wherein the second range corresponds to a range that is smaller than a level which reduces an ADC dynamic range too much due to a large black level.

5. The method of claim 1, wherein the first range and the second range are programmable.

6. The method of claim 2, wherein measuring the black level and adjusting the DAC code such that the black level is moved toward the first range, further comprises adjusting a frequency associated with measuring the black level and adjusting the DAC code.

7. The method of claim 6, wherein the frequency can be from a frame-to-frame frequency to a line-by-line frequency.

8. The method of claim 5, wherein when the black level has been calibrated holding the DAC output until the black level moves beyond the second range.

9. The method of claim 8, wherein adjusting the DAC code such that the black level is moved toward the first range further comprises using a small step size.

10. The method of claim 5, further comprising determining a step size in which to adjust the DAC code.

11. The method of claim 10, wherein determining the step size in which to adjust the DAC code, further comprises using a small step size when the black level is within the second range.

12. The method of claim 11, wherein determining the step size in which to adjust the DAC code, further comprises using a large step size when the black level is beyond the second range.

13. The method of claim 5, wherein determining if the black level has been calibrated, further comprises determining if the black level has been within the first range.

14. An apparatus for calibrating a black level to reduce flicker noise, comprising:
   a processing circuit configured to perform the following steps:
      comparing the black level to a first range and a second range;
      determining when the black level is within the second range; and when it is:
         determining if the black level has been calibrated, and when it has been outputting a signal to a DAC including an output, wherein the signal includes information used by the DAC to hold the output constant; otherwise
         outputting a signal to the DAC, wherein the signal includes DAC code information used by the DAC to adjust the output such that the black level is moved toward the first range.

15. The apparatus of claim 14, wherein the second range is larger than the first range.

16. The apparatus of claim 14, further comprising a PGA coupled to the DAC, and the processing circuit, wherein the first range corresponds to a range that is larger than a noise level at a highest gain associated with the PGA.

17. The apparatus of claim 16, further comprising an ADC coupled to the processing circuit and the PGA, wherein the second range corresponds to a range that is smaller than a level which reduces a dynamic range relating to the ADC too much due to a large black level.

18. The apparatus of claim 15, wherein determining if the black level has been calibrated, further comprises adjusting a frequency to measure the black level.

19. The apparatus of claim 18, wherein the frequency can be from a frame-to-frame frequency to a line-by-line frequency.

20. The apparatus of claim 14, wherein the first range and the second range are programmable.

21. The apparatus of claim 20, wherein when the black level has been calibrated holding a DAC output until the black level moves beyond the second range.

22. The apparatus of claim 21, wherein adjusting the DAC code such that the black level is moved toward the first range further comprises using a small step size.

23. The apparatus of claim 22, wherein adjusting the DAC code further comprises setting a time to adjust the DAC code.

24. The apparatus of claim 20, further comprising determining a step size in which to adjust the DAC code.

25. The apparatus of claim 24, wherein determining the step size in which to adjust the DAC code, further comprises using a small step size when the black level is within the second range.

26. The apparatus of claim 25, wherein determining the step size in which to adjust the DAC code, further comprises using a large step size when the black level is beyond the second range.

27. The apparatus of claim 20, wherein determining if the black level has been calibrated, further comprises determining if the black level has been within the first range.

28. An apparatus for calibrating a black level to reduce flicker noise, comprising:
   means for measuring the black level;
   means for comparing the black level to a first range and a second range; and
   means for determining when the black level is within the second range; and when it is:
      means for determining if the black level has been calibrated, and when it has been, means for holding a DAC code; otherwise
      means for adjusting the DAC code such that the black level is moved toward the first range.

* * * * *